United States Patent
Loughran

(10) Patent No.: US 10,601,977 B2
(45) Date of Patent: Mar. 24, 2020

(54) MESSAGING APPLICATION

(71) Applicant: Nick Loughran, Durham (GB)

(72) Inventor: Nick Loughran, Durham (GB)

( * ) Notice: Subject to any disclaimer, the term of this patent is extended or adjusted under 35 U.S.C. 154(b) by 0 days.

(21) Appl. No.: 15/774,108

(22) PCT Filed: Jul. 18, 2017

(86) PCT No.: PCT/GB2017/052107
§ 371 (c)(1),
(2) Date: May 7, 2018

(87) PCT Pub. No.: WO2018/015735
PCT Pub. Date: Jan. 25, 2018

(65) Prior Publication Data
US 2019/0132438 A1     May 2, 2019

(30) Foreign Application Priority Data

Jul. 19, 2016   (GB) .................................. 1612509.8
Dec. 14, 2016   (GB) .................................. 1621290.4

(51) Int. Cl.
*H04M 1/725*     (2006.01)
*G06F 21/62*     (2013.01)
(Continued)

(52) U.S. Cl.
CPC .... *H04M 1/72552* (2013.01); *G06F 3/04886* (2013.01); *G06F 17/211* (2013.01);
(Continued)

(58) Field of Classification Search
CPC .......... H04M 1/72552; H04M 1/72577; H04L 51/046; H04L 51/16; H04L 51/04;
(Continued)

(56) References Cited

U.S. PATENT DOCUMENTS 6,360,118 B1 *  3/2002  Uhlemann ........... A61B 5/0006
                                                        600/509
6,631,482 B1 * 10/2003  Marks .................... G06F 21/62
                                                        714/38.14
(Continued)

FOREIGN PATENT DOCUMENTS

EP    2713253       2/2014
WO    2007068082    6/2007

OTHER PUBLICATIONS

International Search Report and Written Opinion for related PCT Application PCT/GB2017/052107, dated Jul. 11, 2017 (11 pages).

*Primary Examiner* — Magdi Elhag
(74) *Attorney, Agent, or Firm* — Winthrop & Weinstine, P.A.; Nadeem W. Schwen

(57) ABSTRACT

A messaging application for use on electronic devices, each electronic device having a display and a connection to a communication system. The application has two modes, a first mode in which the symbols of text messages are concealed and a second mode in which the symbols of a text message are displayed, the application controlling the display of text on the display according to an algorithm. The algorithm detects whether the application is in the first mode or the second mode, and if the application is in the first mode the current symbol entered is displayed and any previously entered symbols entered with the application in the first mode are concealed.

15 Claims, 18 Drawing Sheets

(51) Int. Cl.
*H04W 4/12* (2009.01)
*G06F 3/0488* (2013.01)
*G06F 17/24* (2006.01)
*G06F 17/21* (2006.01)
*H04L 12/58* (2006.01)

(52) U.S. Cl.
CPC .......... *G06F 17/24* (2013.01); *G06F 21/6245* (2013.01); *H04L 51/04* (2013.01); *H04L 51/046* (2013.01); *H04L 51/12* (2013.01); *H04L 51/16* (2013.01); *H04L 51/22* (2013.01); *H04M 1/72577* (2013.01); *H04W 4/12* (2013.01); *G06F 3/04883* (2013.01); *G06F 2221/031* (2013.01); *G06F 2221/032* (2013.01); *H04M 2201/40* (2013.01); *H04M 2250/74* (2013.01)

(58) Field of Classification Search
CPC .......... H04L 51/12; H04W 4/12; H04W 4/22; G06F 21/6245; G06F 3/04886; G06F 17/211; G06F 17/24
See application file for complete search history.

(56) References Cited

U.S. PATENT DOCUMENTS

| | | | |
|---|---|---|---|
| 9,423,947 B2* | 8/2016 | Murakami | G06F 3/0486 |
| 9,913,114 B1* | 3/2018 | Wu | H04W 4/14 |
| 2002/0070964 A1 | 6/2002 | Botz et al. | |
| 2006/0123570 A1* | 6/2006 | Pace | A61C 17/22 15/22.1 |
| 2007/0033647 A1 | 2/2007 | Yang et al. | |
| 2008/0172715 A1 | 7/2008 | Geiger et al. | |
| 2008/0229230 A1 | 9/2008 | Grigoriev et al. | |
| 2010/0064375 A1 | 3/2010 | Gorczowski et al. | |
| 2013/0067385 A1* | 3/2013 | Demopoulos | G06F 3/0233 715/780 |
| 2014/0129974 A1* | 5/2014 | Ben-Harrush | G06F 3/0484 715/781 |
| 2014/0201527 A1 | 7/2014 | Krivorot | |
| 2014/0256288 A1* | 9/2014 | Allen | H04W 12/02 455/411 |
| 2014/0365932 A1* | 12/2014 | Hwang | G06F 3/04886 715/768 |
| 2015/0007351 A1 | 1/2015 | Janajri et al. | |
| 2015/0288633 A1* | 10/2015 | Ogundokun | H04L 51/12 709/206 |
| 2016/0062975 A1* | 3/2016 | Yamahara | G06F 21/31 715/224 |
| 2016/0094495 A1 | 3/2016 | Ahuja et al. | |
| 2017/0192646 A1* | 7/2017 | Zhang | G06F 3/04817 |
| 2017/0351864 A1* | 12/2017 | Murakami | G06F 21/6218 |
| 2018/0260581 A1* | 9/2018 | Adams | G06F 21/84 |
| 2018/0302363 A1* | 10/2018 | Abedini | H04L 51/20 |
| 2018/0336339 A1* | 11/2018 | Wang | G06F 21/46 |

* cited by examiner

MESSAGING APPLICATION

CROSS-REFERENCE TO RELATED APPLICATIONS

This application is a national stage application of, and claims priority to, International PCT Application No. PCT/GB2017/052107, titled "MESSAGING APPLICATION," filed Jul. 18, 2017, which claims priority to GB Application No. 1621290.4, filed Dec. 14, 2016, and GB Application No. 1612509.8, filed Jul. 19, 2016, each of which the disclosure is hereby incorporated by reference herein in its entirety.

FIELD OF THE INVENTION

The present invention relates to a messaging application and in particular to a messaging application where the sender of the message and its recipient may conceal the content of a message from bystanders.

BACKGROUND OF THE INVENTION

The sending of messages between individuals using electronic devices, and in particular, mobile electronic devices such as smart phones (telephones that connect to the internet) is well known and very widespread.

There are many situations where senders and recipients of messages would like to be able to prevent bystanders from looking at messages they are writing or reading. This may be simply because the sender/recipient desires privacy, or it may be that the content of the message is sensitive or the information contained therein valuable.

It would therefore be desirable to provide a messaging application where senders and recipients may prevent bystanders from viewing messages being written and read.

When writing a message it is desirable to be able to review the message before sending it. To this end it would be desirable to provide in a messaging application the ability to review a messages that is otherwise concealed from bystanders.

US20160094495 describes a messaging application where a text message can have embedded with it a text effect. The text effect allows the message sent to the recipient to be scrambled, obscured or modified. When viewing the text message, the recipient can switch between viewing the text message with the text effect and viewing the text message without the text effect. Also, on the display of the sender.1s device, the sender can select the way the written text message is displayed, for example with a text effect or without.

The problem with the messaging application described in US2016094495 is that a string of previous messages remains visible to bystanders and also the message that is being written may be viewed by a bystander until such time as the text effect is applied.

It would be desirable to provide a means of concealing text in messages that is simpler and more effective that the prior art systems.

SUMMARY OF THE INVENTION

According to the invention there is provided a messaging application for use on electronic devices, each electronic device having a display and a connection to a communication system, wherein the application has two modes, a first mode in which the symbols of text messages are concealed and a second mode in which the symbols of a text message are displayed, wherein the application controls the display of text on the display according to an algorithm, and wherein the algorithm detects whether the application is in the first mode or the second mode, and if the application is in the first mode the current symbol entered is displayed and any previously entered symbols entered with the application in the first mode are concealed.

The symbols may be entered by typing, by voice recognition or any other suitable symbol entering means.

The previously entered symbols may be symbols of a whole message or a string of characters forming part of a message, for example, one word within a message may be concealed with the rest visible.

The last typed symbol may be concealed after a pre-determined period of time, for example one second.

The string of characters may be a complete message or a part of a message, such as one or more words or other Preferably, the application provides a switching means, the switching means permitting a user to switch between the first mode and the second mode. For example, an icon may be provided on the display, or a key of a keypad may be dedicated to provide a switching means.

The text message may be written in either the first mode or the second mode.

It is preferred that, the algorithm has a default setting to display a received message in the first mode.

Advantageously, the communication system includes the internet and a connection to the internet.

Symbols may concealed by replacing user entered symbols with one or more non-user entered symbols individually.

The application may permit a limited number of switches between the first and second modes.

The application may delete the content of messages after a pre-determined time period.

The application may provide a back up whereby messages that have been deleted may be recovered from a back up.

According to a second aspect of the invention there is provided an electronic device programmed with a messaging application according to the first aspect of the invention, the electronic device having: a connection means for connecting to a communication system and a display.

Preferably, the electronic device is one of: a mobile telephone, a smart phone, a mobile computer device, a laptop computer, and a desk top computer.

Preferably, the communication system includes the internet and the connection means enables a connection to the internet.

According to a third aspect of the invention there is provided a method of sending messages wherein parts of the message may be selectively concealed and revealed, the method comprising the step operating the messaging application of the first aspect of the invention on at least one electronic device and selecting the first or second mode.

The application and an electronic device programmed with the application provide a convenient way for individuals to exchange information, whilst keeping the information private when users are in places where other individuals are present.

The word, "text message" is not intended to limit the to any particular format of message. The application of the invention may be used in internet based messaging applications, email messages, sms messages, etc.

The word, "application" shall be understood as a computer program.

DETAILED DESCRIPTION OF THE DRAWINGS

In the Drawings, which illustrate a preferred embodiment of the invention in a number of different conditions:

DETAILED DESCRIPTION OF THE PREFERRED EMBODIMENT

Figure 1:
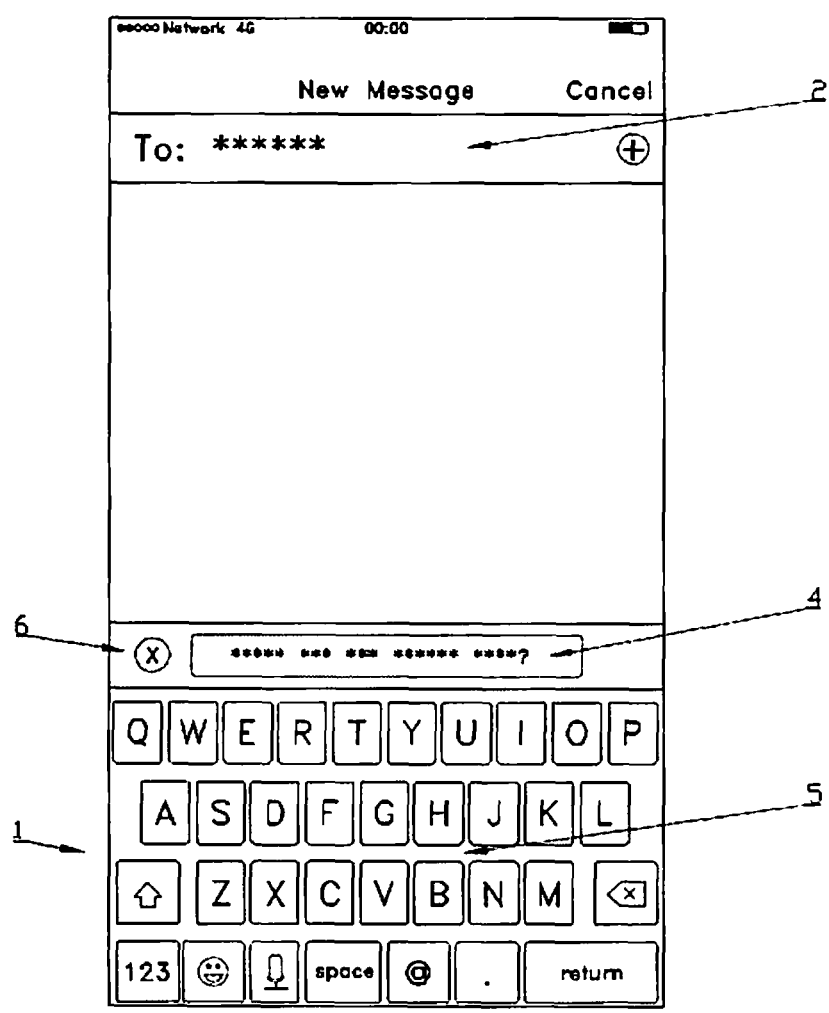
FIG. 1 is a representation of a smart phone operating the messaging system of the invention in a first condition.

Referring now to FIG. 1, there is shown a smart phone 1 equipped with a messaging system according to the invention. At the beginning of an exchange of messages with another person having smart phone also running a messaging application according to the invention, the person sending the initial message selects the "conceal text" mode by pressing the icon 6. When in "conceal text" mode the letter that is typed using the key board 5 is shown until the next letter (or other symbol) is typed. The previously shown user entered symbol is replaced by a non-user generated symbol, an asterix in the present example, when the next symbol is pressed. In FIG. 1, the message to be sent to the recipient has already been typed and is shown in concealed form in the text entry box 4 with the last letter typed still visible, that being the question mark "?". The application may be configured so that the last letter typed is concealed after a pre-determined period of time, for example 1 second. The application may further provide that a user may set this pre-determined period of time.

In this embodiment, the pressing of a the "space" key does not result in a non-user entered symbol being displayed when the next letter is typed. However, the system may be configured such that the space is replaced by a non-user entered symbol upon entry of the next symbol.

Before sending all but the shortest of messages it is likely that the sender would want to review the message to check and perhaps edit it. By pressing the icon 6 again, the "conceal text" mode is switched off.

Figure 2:
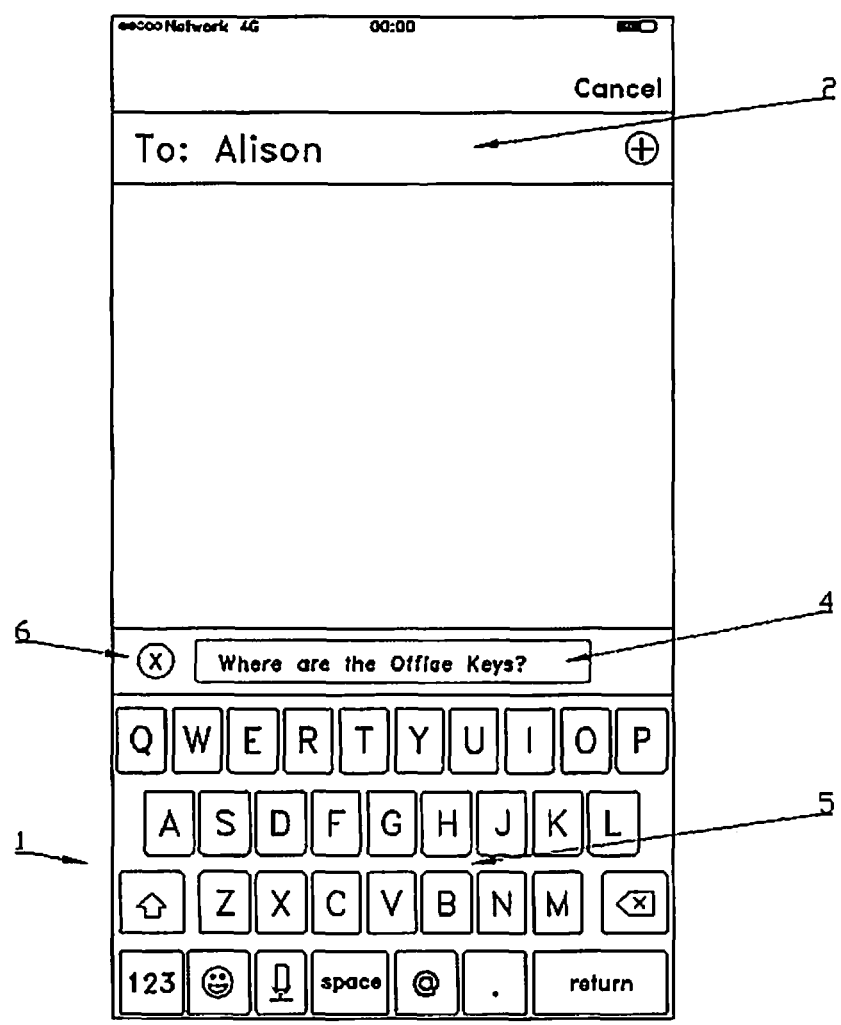
FIG. 2 is a representation of a smart phone operating the messaging system of the invention in a second condition.

The plain message is shown in FIG. 2. Having reviewed the text in boxes 2 and 3 the sender presses the icon 6 again to revert to "conceal text" mode.

Figure 3:
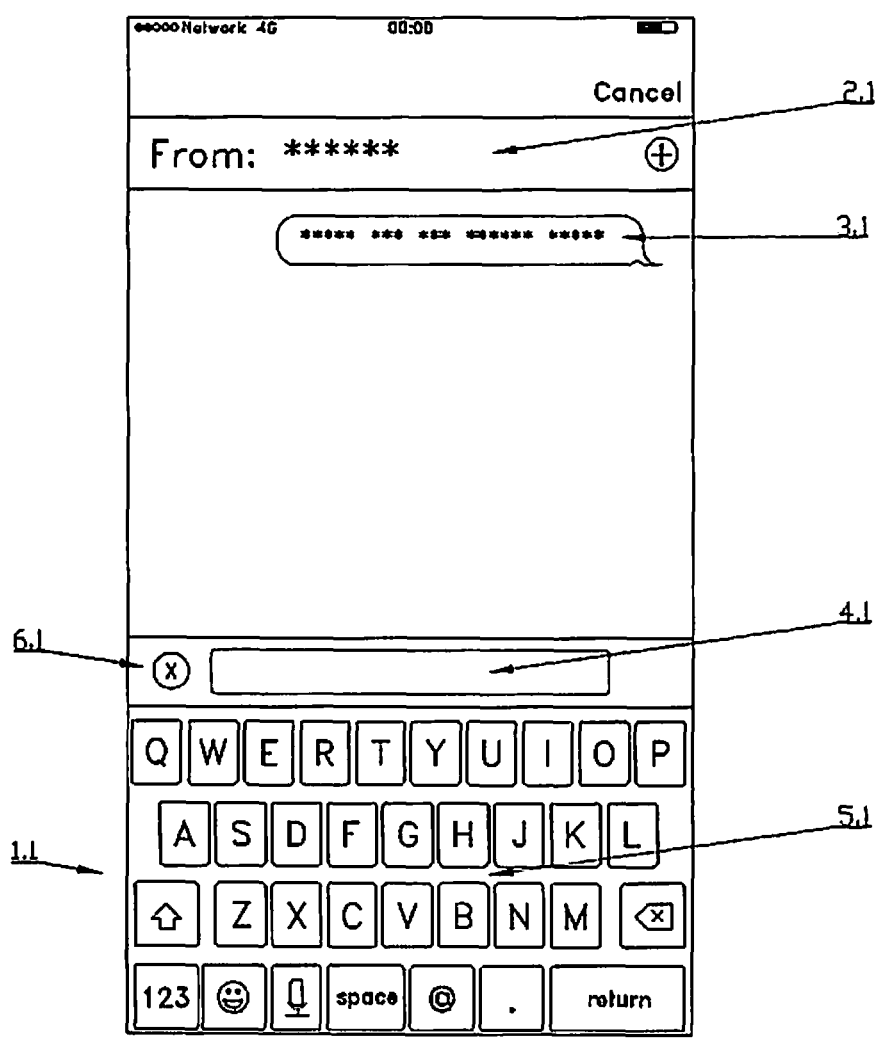
FIG. 3 is a representation of a smart phone operating the messaging system of the invention in a third condition.

FIG. 3 illustrates the recipients smart phone 1.1 illustrates the recipients smart phone 1.1 on receipt of a message. Messages received are automatically shown in the "conceal text" mode.

Figure 4:
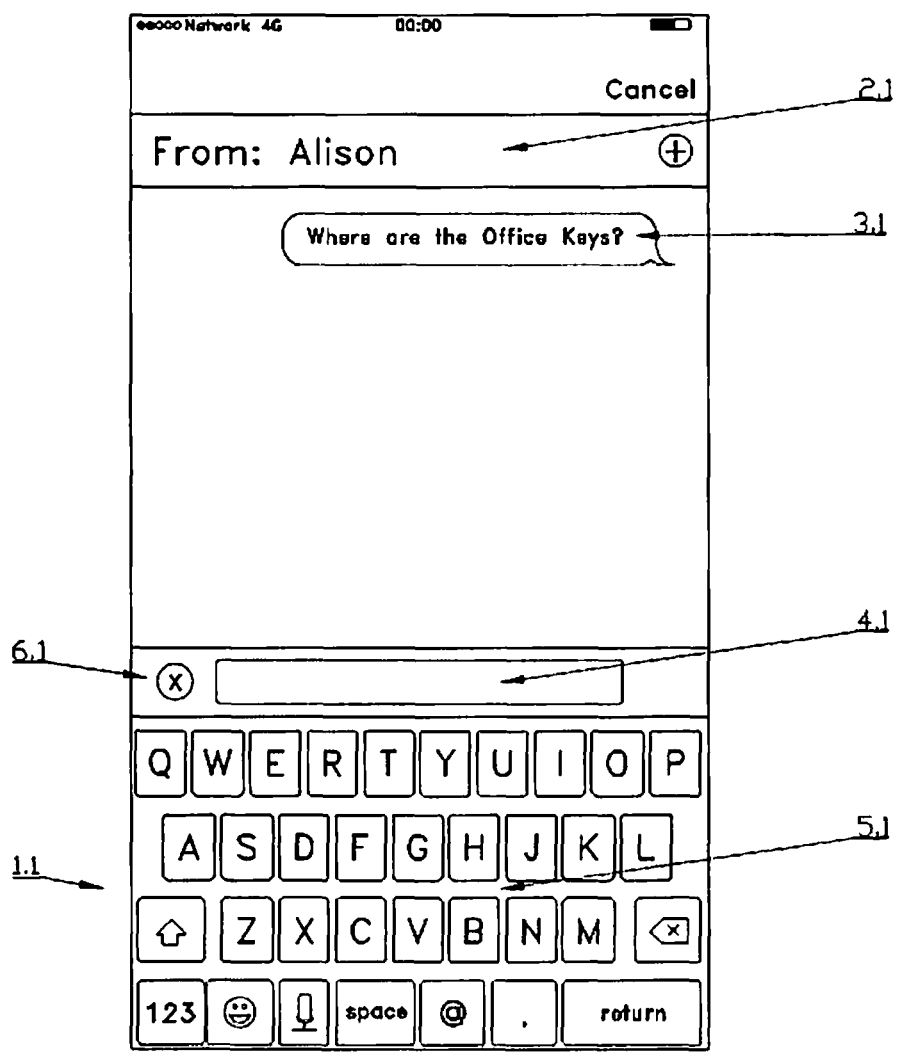
FIG. 4 is a representation of a smart phone operating the messaging system of the invention in a fourth condition.

FIG. 4 illustrates what happens when the recipient presses the "conceal text" icon 6.1. The message is revealed, showing that the message has been sent by "Office" and that the message is, "where are the office keys".

Figure 5:
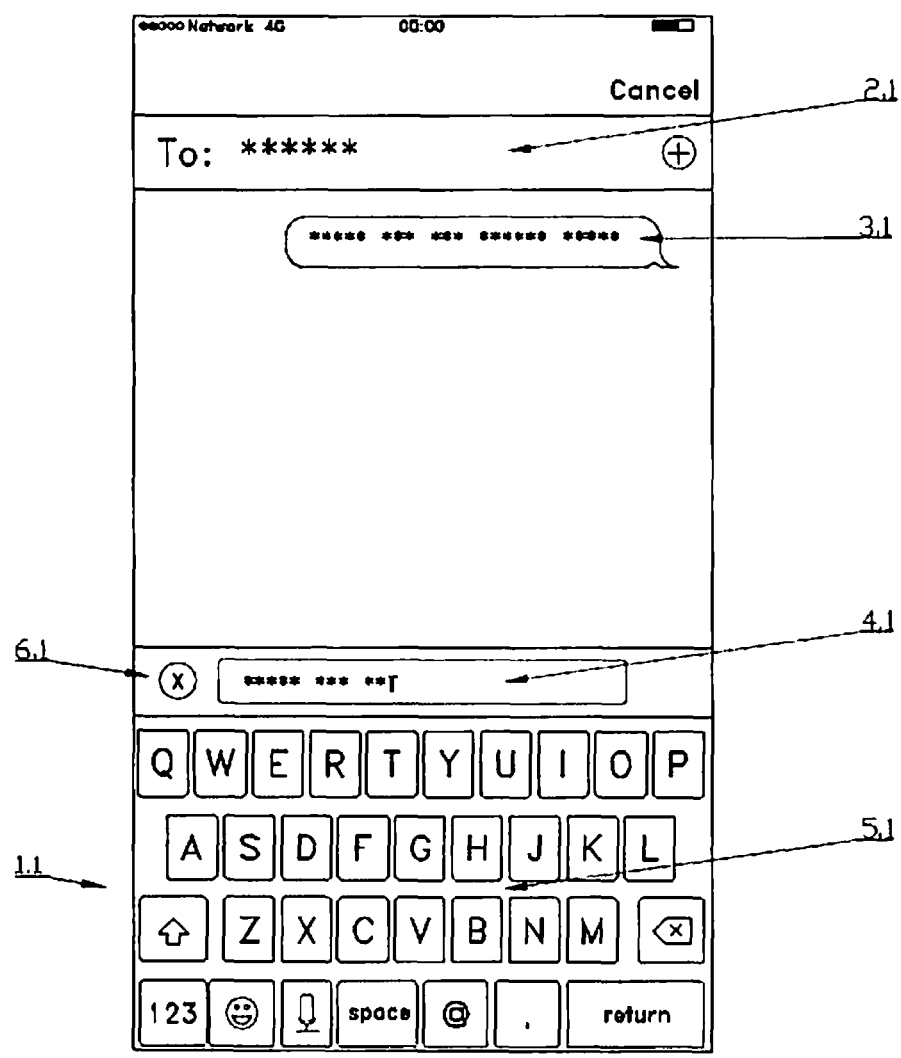
FIG. 5 is a representation of a smart phone operating the messaging system of the invention in a fifth condition.

In FIG. 5 the recipient is has switched back into "conceal text" mode by pressing the icon 6.1. As can be seen, the text typed in the box 4.1 is concealed with the exception of the last typed symbol, "T".

Figure 6:
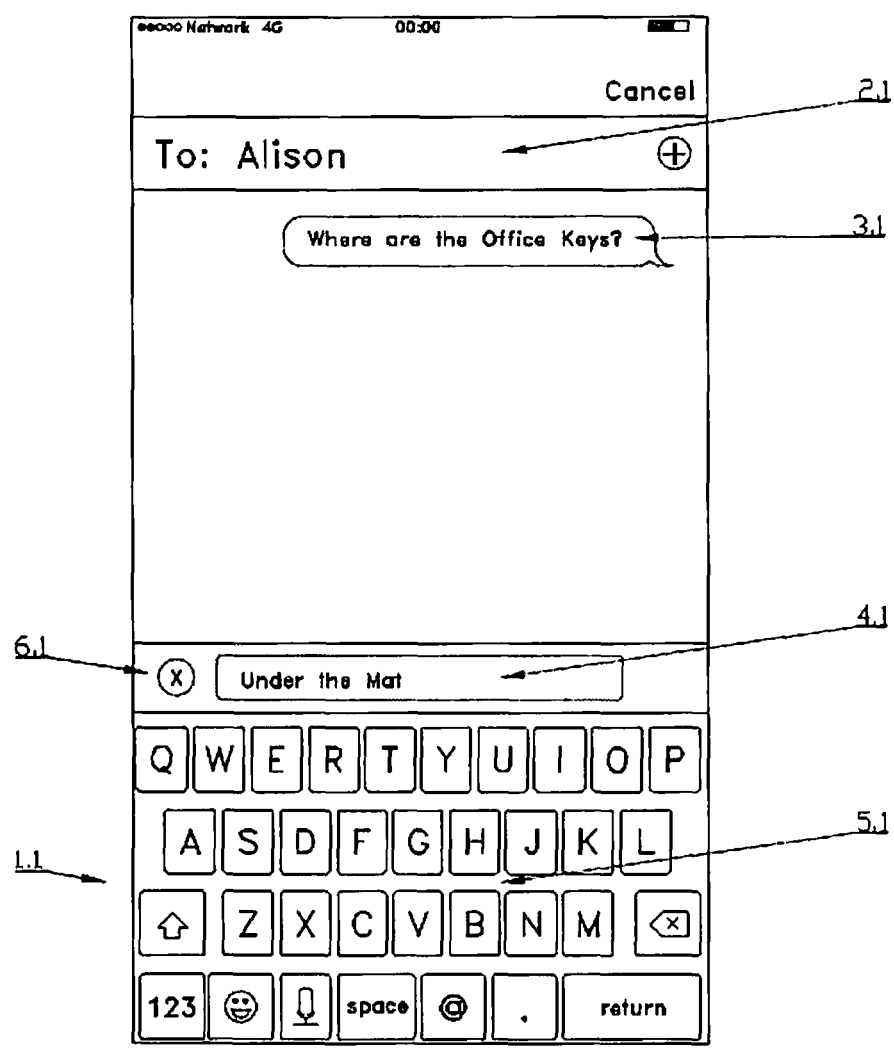
FIG. 6 is a representation of a smart phone operating the messaging system of the invention in a sixth condition.
Figure 7:
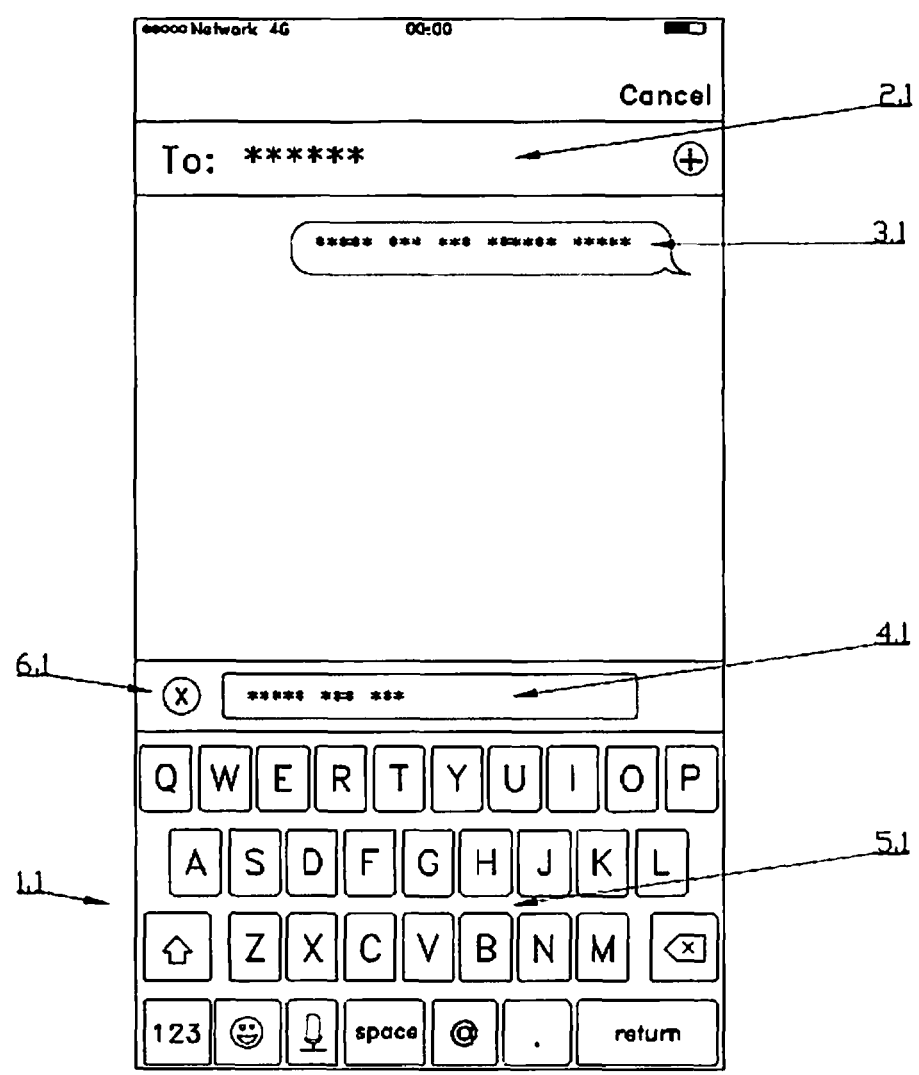
FIG. 7 is a representation of a smart phone operating the messaging system of the invention in a seventh condition.

In FIG. 6 the recipient has pressed the "conceal text" icon 6.1 to show the message typed in box 4.1 before sending. The message may be sent directly or may be switched to being concealed by pressing the "conceal text" icon 6.1 as shown in FIG. 7. In both cases, when the message is received on the original message sender's smart phone 1, the message will be shown in the "conceal text" mode.

Figure 8:
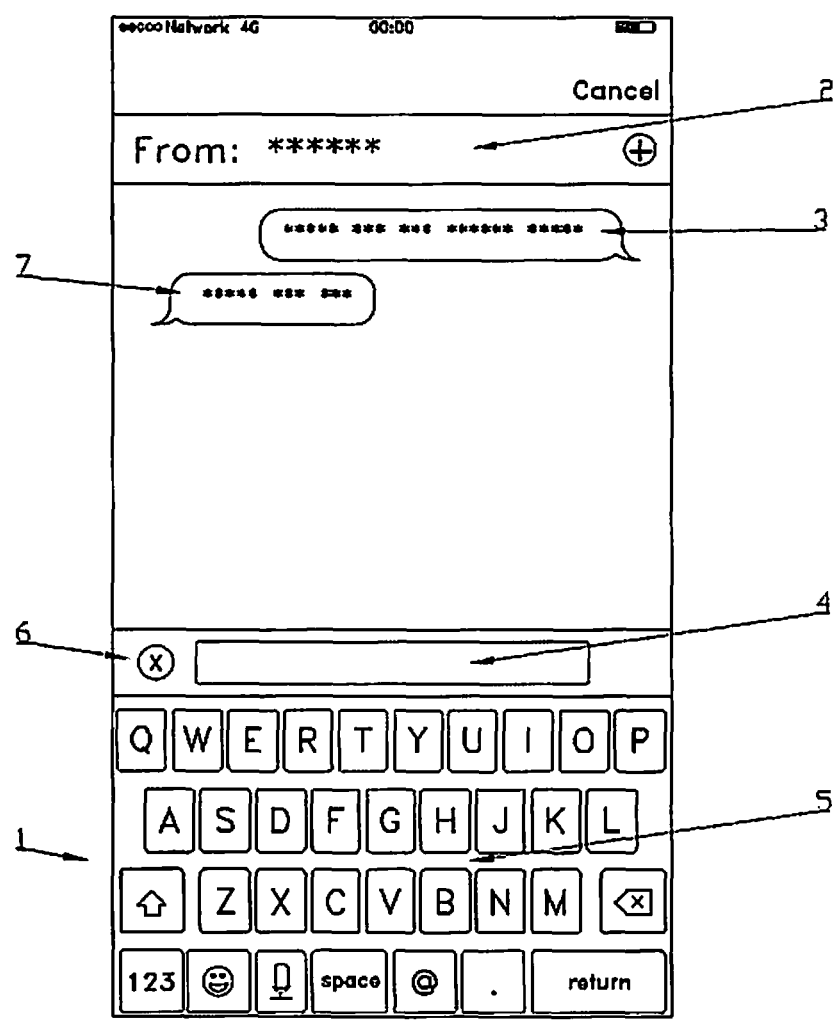
FIG. 8 is a representation of a smart phone operating the messaging system of the invention in a eighth condition.

In FIG. 8 the message, "under the mat" is received by the original message sender on the smart phone 1. The message is concealed, as is the original message in text box 3 and the identity of the sender in text box 2.

Pressing the "conceal text" icon 6 reveals the text of the reply message, i.e. "under the mat".

Figure 9:
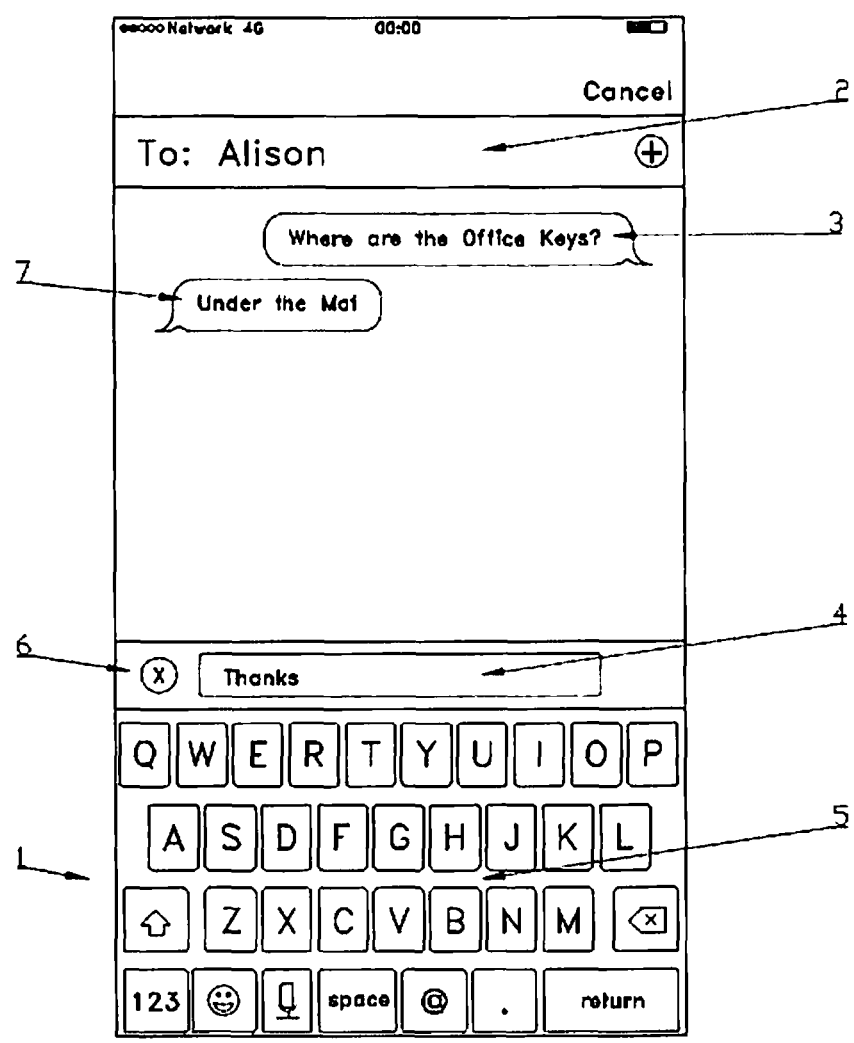
FIG. 9 is a representation of a smart phone operating the messaging system of the invention in a ninth condition.
Figure 10:
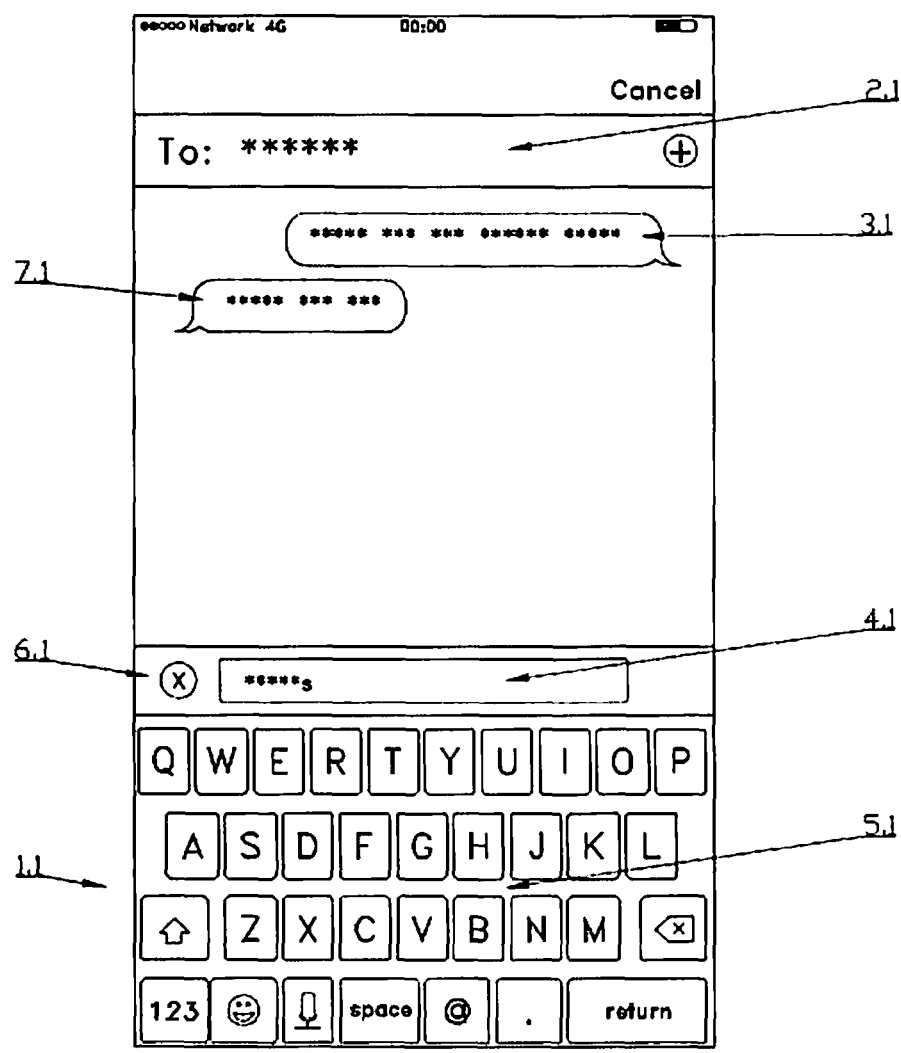
FIG. 10 is a representation of a smart phone operating the messaging system of the invention in a tenth condition.
Figure 11:
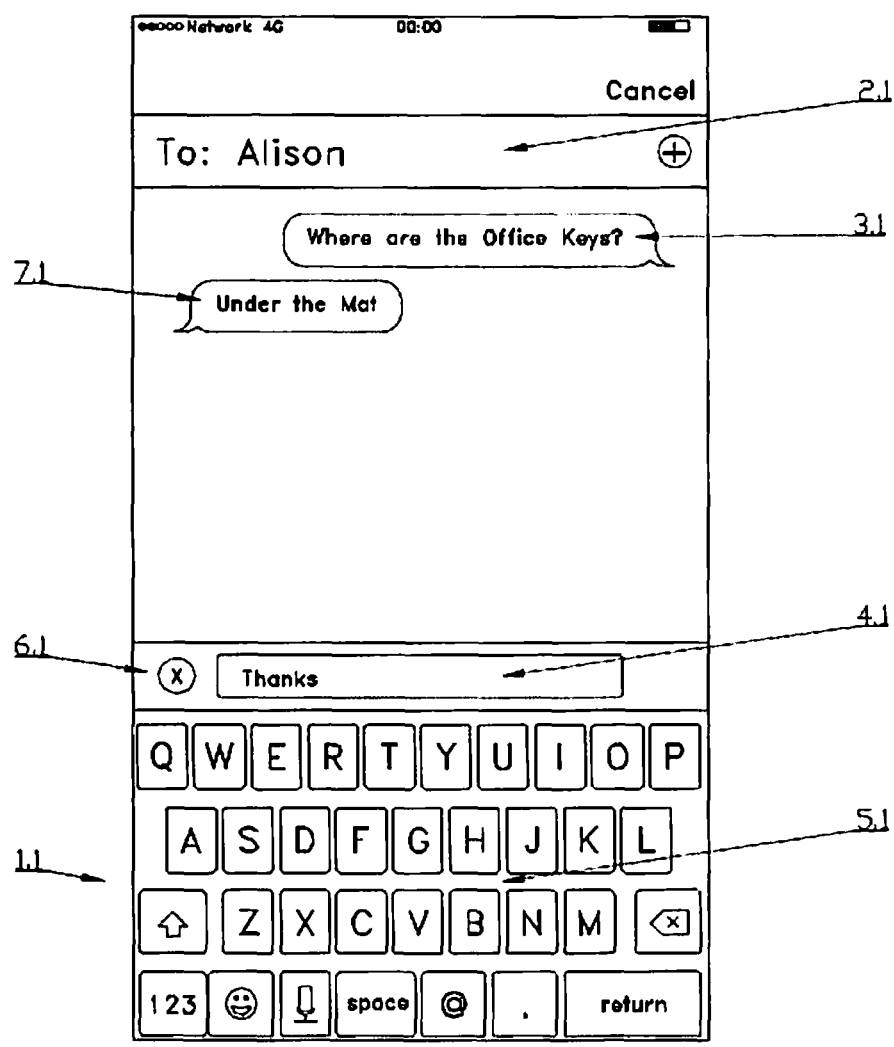
FIG. 11 is a representation of a smart phone operating the messaging system of the invention in a eleventh condition.

In FIG. 9 the reply, "thanks" is shown in text box 4. The "conceal text" icon 6 has not been pressed again and hence the last received message, shown in box 7, and the message to be next sent which is shown in box 4 can both be read. If the person using the smart phone 1 does not consider a need to conceal the text, for example because the text on the smart phone 1 cannot be read by a bystander, there is no need to switch back into the "conceal text" mode. The message, "thanks" is sent. It will be received on the smart phone 1.1 in the "conceal text" mode as shown in FIG. 10 unless the user of smart phone 1.1 has changed the settings in the application so that the text of the message is shown as shown in FIG. 11.

The concealing of text functions as follows:

The default setting is that the text in both sent and received messages is concealed. As a message is typed only the symbol currently being typed is shown. As soon as the next symbol is typed the previous symbol is concealed. In a message that is lengthy it is desirable to be able to review what is written. This is facilitated by an on/off function. At any point the "conceal text" function can be switched off so that the message can be reviewed. Once reviewed the "conceal text" function is switched on again, and the message is concealed.

When the message is sent to another device utilising the text concealment function of the invention it is displayed on receipt in a concealed manner. This is the default setting. The message recipient switches off the "conceal text" mode to read the message. If the message recipient needs to write a reply there is a choice as to whether the message should be written in the "conceal text" mode or not. If the message recipient is not in an environment where a bystander can see the display of the smart phone then the message recipient is likely to reply out of the "conceal text" mode.

When the reply message is received by the original message sender it is received in "conceal text" mode, whether the reply message was sent in "conceal text" mode or not.

Figure 12:
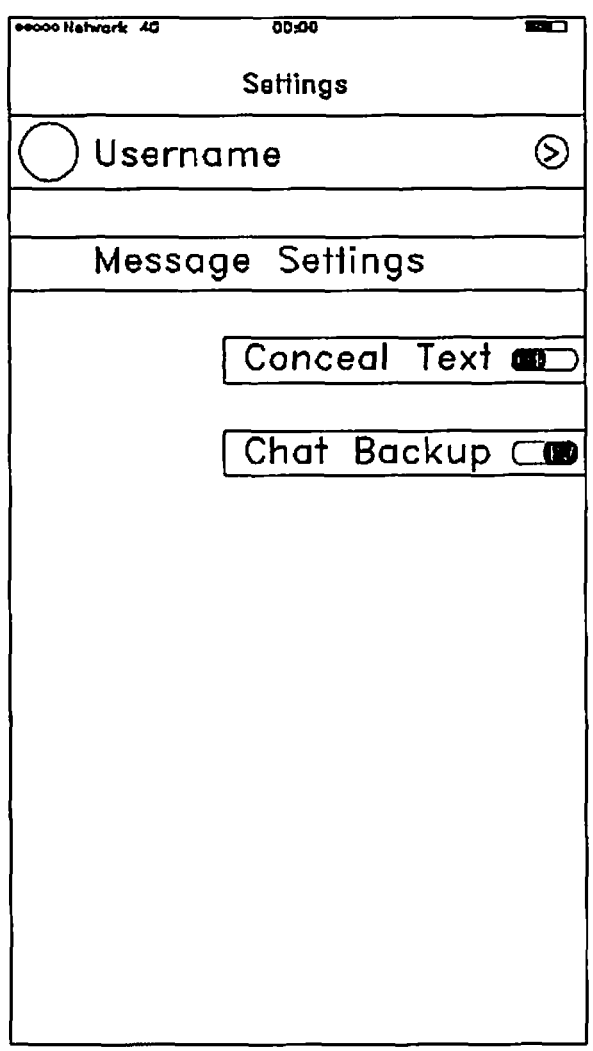
FIG. 12 illustrates user settings.
Figure 13:
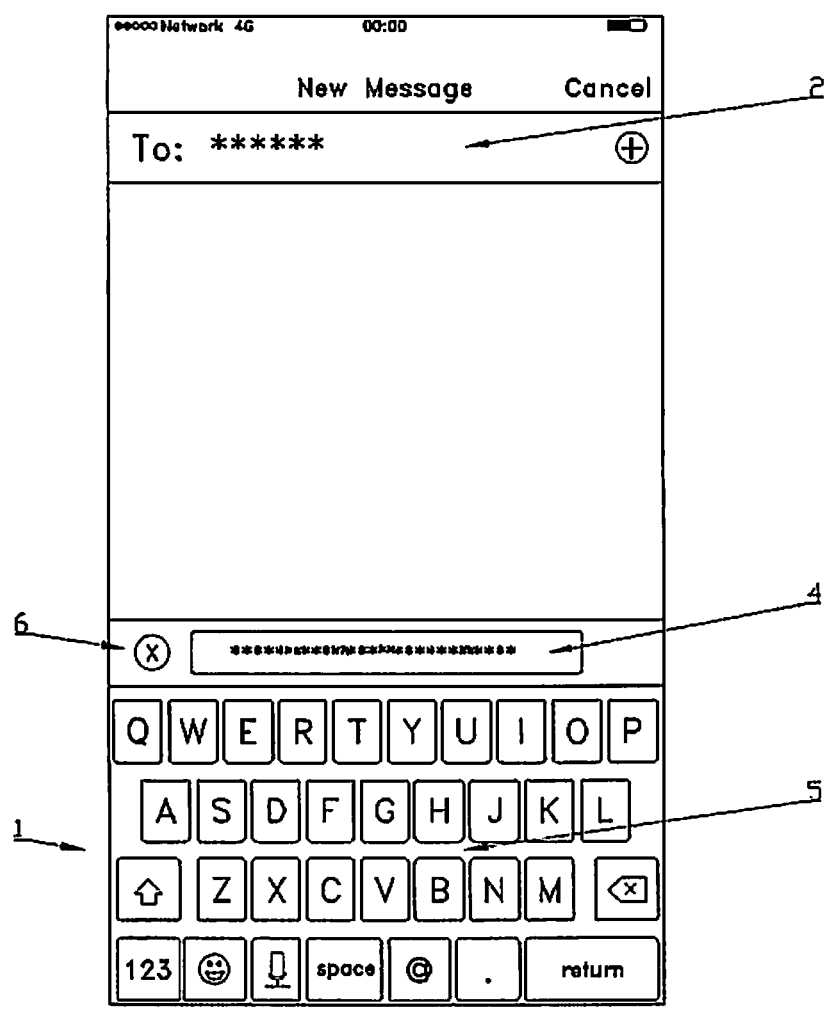
FIG. 13 is a representation of a smart phone operating another embodiment of the messaging system of the invention in a first condition.
Figure 14:
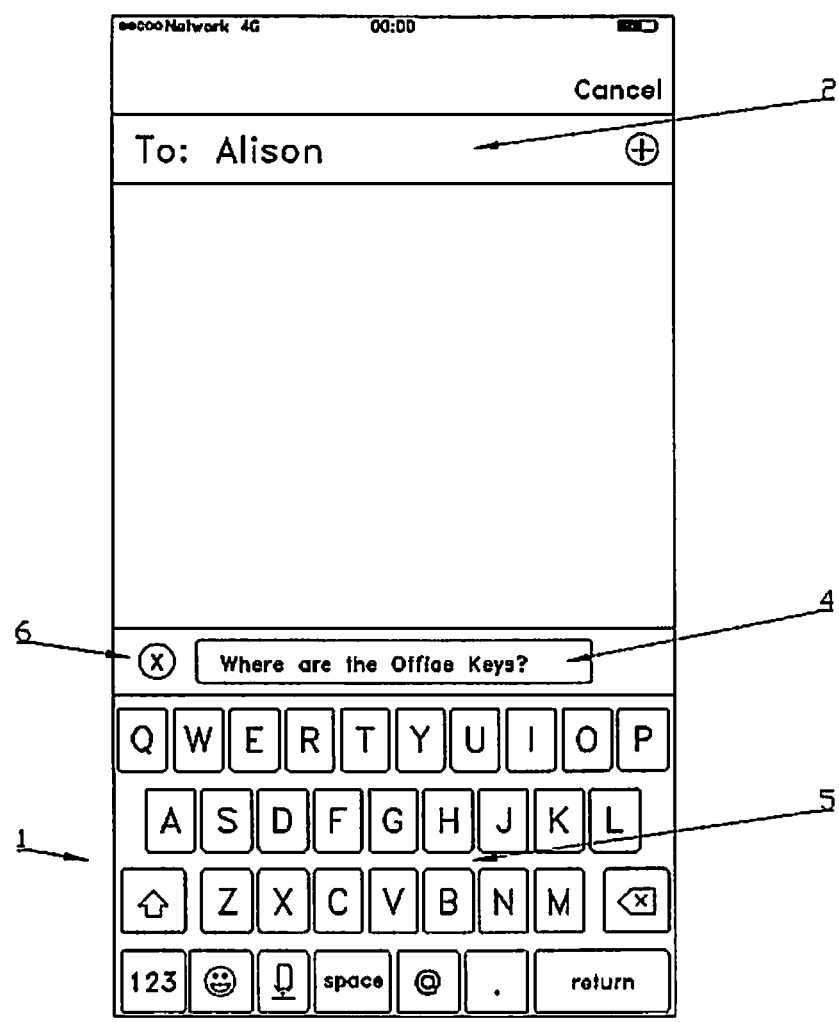
FIG. 14 is a representation of a smart phone operating another embodiment of the messaging system of the invention in a second condition.
Figure 15:
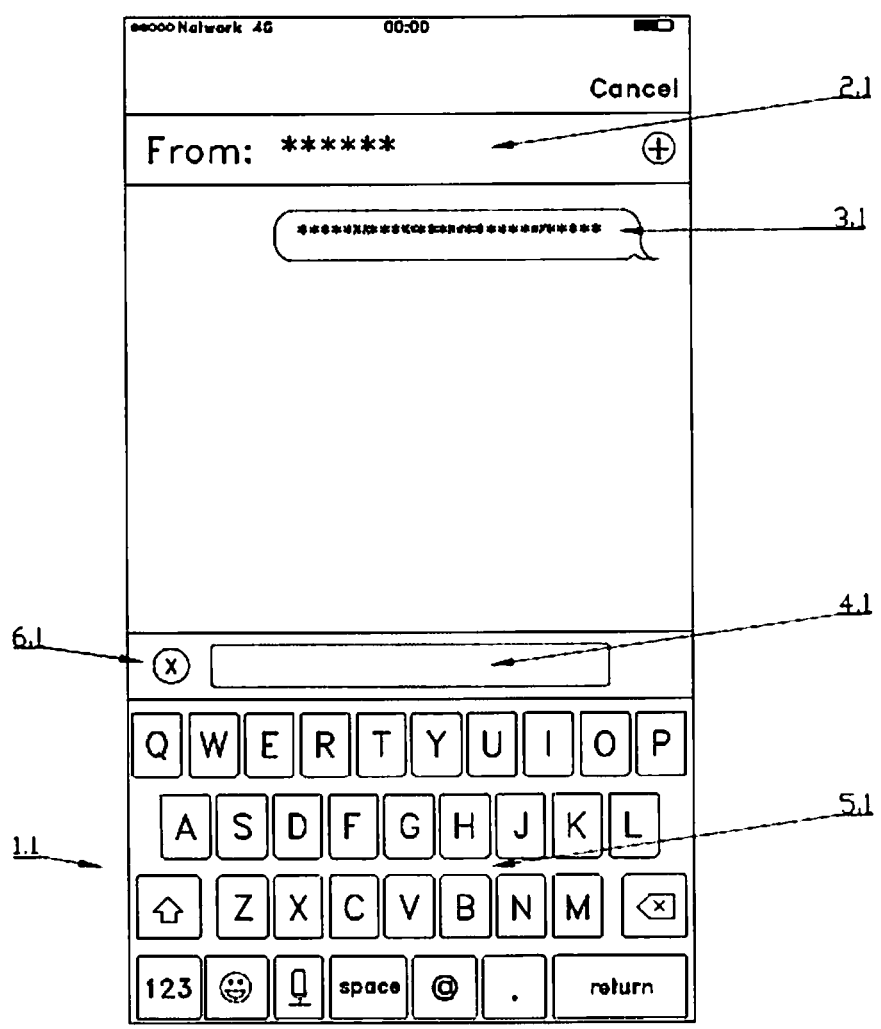
FIG. 15 is a representation of a smart phone operating another embodiment of the messaging system of the invention in a third condition.
Figure 16:
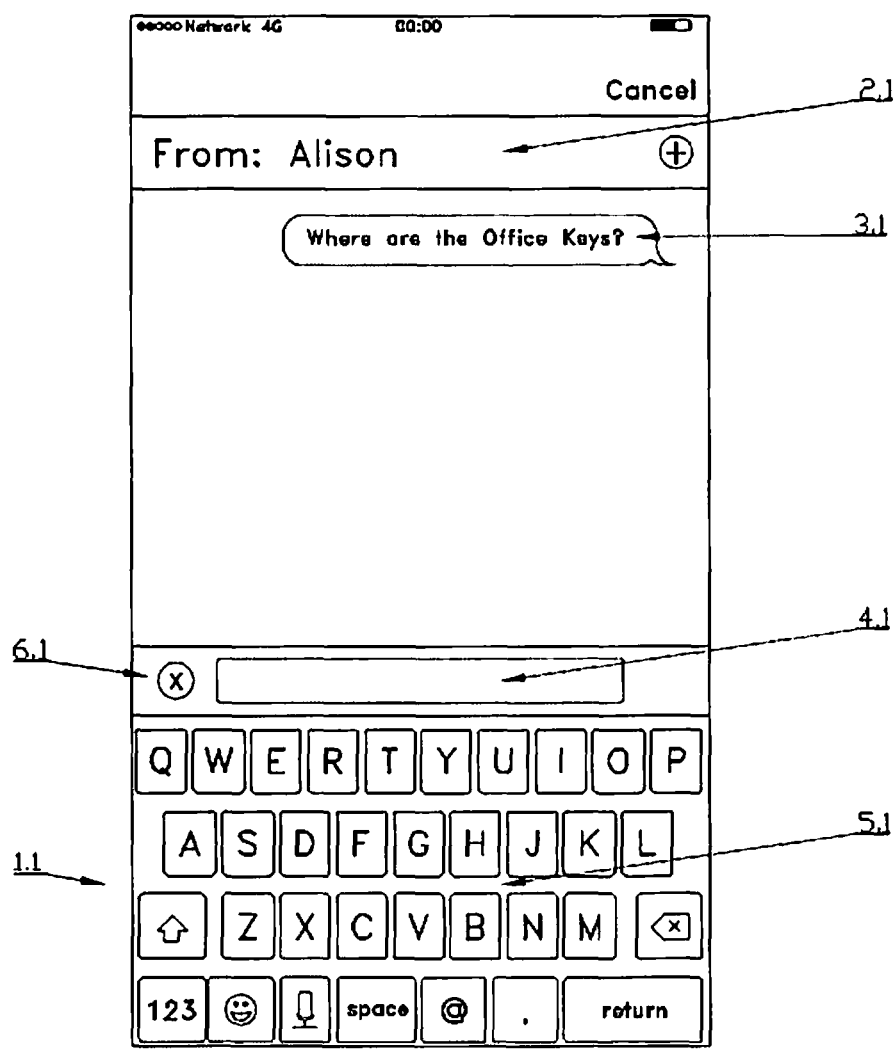
FIG. 16 is a representation of a smart phone operating another embodiment of the messaging system of the invention in a fourth condition.
Figure 17:
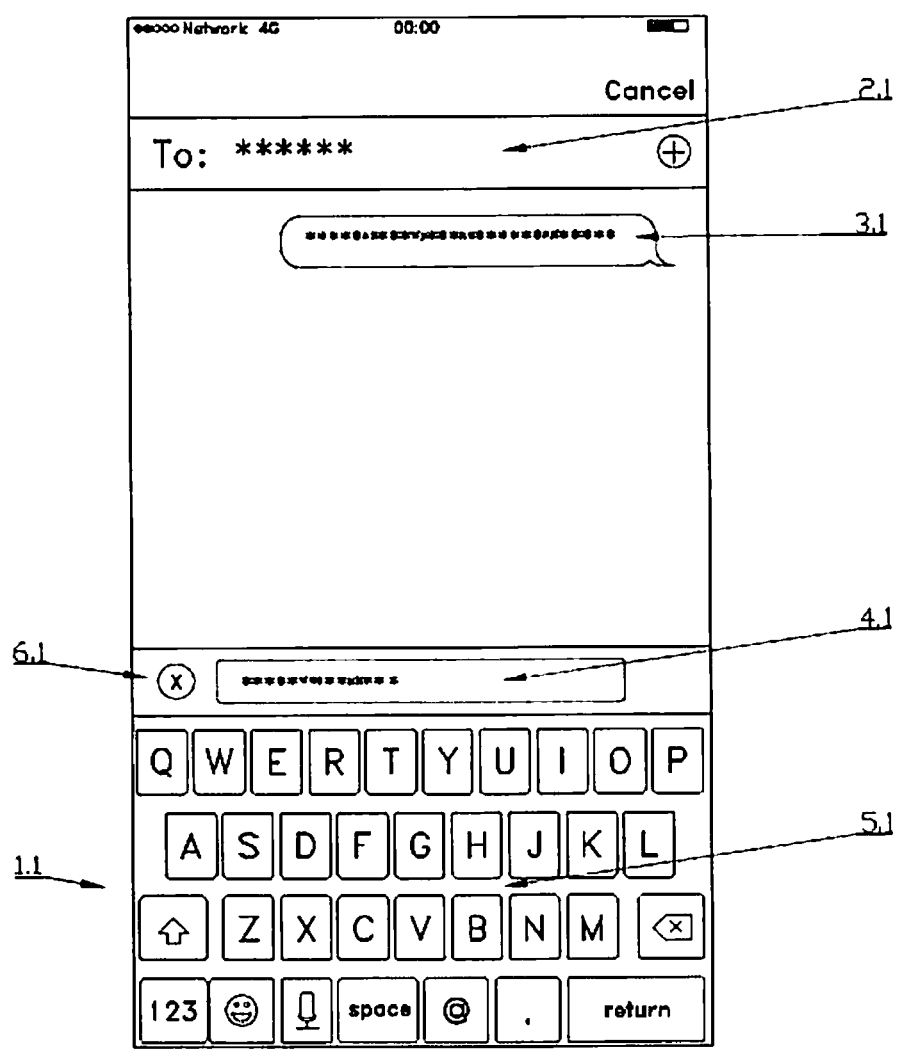
FIG. 17 is a representation of a smart phone operating another embodiment of the messaging system of the invention in a fifth condition.

FIG. 12 illustrates setting provided by the application. The application provided for the user to be able to turn off the "conceal text" mode. This could be useful where one party to an exchange of messages in located where it is not necessary to conceal messages received or sent but the other party is in a location that does require such concealment.

The settings also allow user to decided whether to back messages up or not.

FIGS. 13 to 17, illustrate an alternative embodiment of the invention where instead of the currently entered symbol being shown and previously entered symbols being concealed, each symbol is concealed on entry. Also, spaces between entered symbols are not shown as spaces, but as a symbol indicating concealed text. In this embodiment messages are still more secure, since the typed symbols are themselves never visible. Of course, this embodiment is more difficult for a user and liable to result in more typing errors. However, the user may switch out of the "conceal text" mode to review the message and amend it before reverting to "conceal text" mode before sending the message. This embodiment functions in the same way as the embodiment illustrated in FIGS. 1 to 5, save for the difference in the concealment of text described above.

Figure 18:
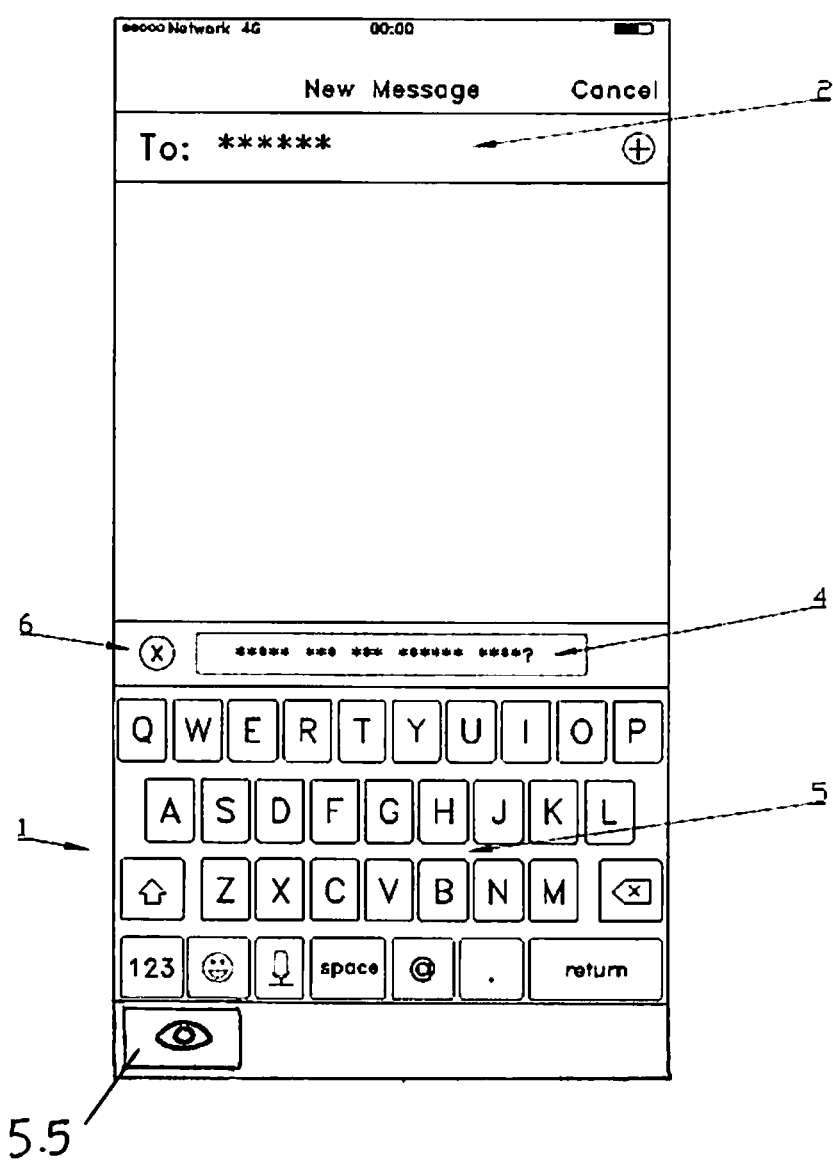
FIG. 18 shows another alternative embodiment of the invention.

The system that allows text to be concealed described above may be incorporated into a keyboard. For example, FIG. 18 shows the keyboard 5 having an additional symbol 5.5. When has pressed the symbol 5.5 pressing the symbols on the 5 keyboard that would cause the same symbol to be displayed in the text box 4, instead causes an alternative symbol to be displayed that prevents the message from being understood. When the symbol 5.5 has been pressed the user may still toggle between concealed and un-concealed presentation by pressing the conceal text icon 6.

The system of the invention is useful in the context of messaging, emails and electronic documents where there is a desired to keep information confidential. For example, if a computer device is provided with the software of the invention and a keyboard having a key or symbol which may be depressed and which causes the keyboard to function in the manner described in the paragraph above, then the user may create documents with concealed sections. Where another party also has a computer provided with the software of the invention and a keyboard as described herein, that user upon opening the document may be able to read the concealed text by clicking on the concealed text or performing an alternative that causes the concealed text to be revealed.

The application of the invention provides a simple, yet very effective and useful way of maintaining privacy when sending and receiving messages.

The invention claimed is:

1. An electronic device programmed with a text writing and message sending and receiving software application, the electronic device having a display and a symbol entering means associated therewith, wherein the application has two modes, a first mode in which entered symbols of a text message are concealed and a second mode in which the entered symbols of the text message are displayed, wherein the application controls concealment and display of symbols on the display according to an algorithm, and wherein the algorithm detects whether the application is in the first mode or the second mode, and if the application is in the first mode, symbols entered are concealed according to the algorithm, the algorithm causing an individually entered symbol to be concealed pursuant to a rule of the algorithm selected from the group comprising: upon entry of the individually entered symbol via the symbol entering means; after a predetermined period of time post entry of the individually entered symbol; and upon entry of a next symbol following entry of the individual entered symbol;
wherein the algorithm causes concealment of an entered symbol by replacing the entered symbol with a non-user entered symbol; and
wherein the application provides a first switching means, the first switching means permitting a user to switch between the first mode and the second mode.

2. An electronic device programmed with a text writing and message sending and receiving application according to claim 1, wherein when the application is in the first mode, the algorithm provides that where an entered symbol represents a space, that entered symbol is not concealed.

3. An electronic device programmed with a text writing and message sending and receiving application according to claim 1, wherein the symbol entry means comprises a keyboard or a voice recognition means.

4. An electronic device programmed with a text writing and message sending and receiving application according to claim 2, wherein the electronic device has a keyboard associated therewith and the keyboard has a key, which key switches the application at least one of on and off.

5. An electronic device programmed with a text writing and message sending and receiving application according to claim 1, wherein symbols may be written in either the first mode or the second mode.

6. An electronic device programmed with a text writing and message sending and receiving application according to claim 1, wherein the algorithm has a default setting to display a received message in the first mode, in which the received message is concealed.

7. An electronic device programmed with a text writing and message sending and receiving application according to claim 1, wherein the application permits a limited number of switches between the first and second modes.

8. An electronic device programmed with a text writing and message sending and receiving application according to claim 1, wherein the application deletes content of messages after a pre-determined time period.

9. An electronic device programmed with a text writing and message sending and receiving application according to claim 1, wherein the application provides a second switching means permitting a user to switch between a fully concealed mode where all the entered symbols are concealed and a principally concealed mode where a current symbol entered is displayed and any previously entered symbols entered with the application in the first mode are concealed.

10. An electronic device programmed with a text writing and message sending and receiving application according to claim 1, wherein the electronic device has a connection means for connecting to a communication system.

11. An electronic device programmed with a text writing and message sending and receiving application according to claim 1, wherein the electronic device is one of: a mobile telephone, a smart phone, a mobile computer device, a laptop computer, and a desk top computer.

12. An electronic device programmed with a text writing and message sending and receiving application according to claim 10, wherein the communication system includes the internet and the connection means comprises means for connecting the device to the internet.

13. A method of sending messages wherein parts of the message are selectively concealed and revealed, the method comprising steps of operating the electronic device programmed with a text writing and message sending and receiving application of claim 1, selecting the first or second mode, sending a message from or receiving a message on the at least one electronic device, and switching between the first and second modes.

14. A combination of a communication system and at least two electronic devices, each electronic device having a connection means for connecting to the communication system and each electronic device being programmed with a text writing and message sending and receiving software application for use on electronic devices, each electronic device having a display and a symbol entering means associated therewith, wherein the application has two modes, a first mode in which entered symbols of a text message are concealed and a second mode in which the entered symbols of the text message are displayed, wherein the application controls concealment and display of symbols on the display according to an algorithm, and wherein the algorithm detects whether the application is in the first mode or the second mode, and if the application is in the first mode, symbols entered are concealed according to the algorithm, the algorithm causing an individually entered symbol to be concealed pursuant to a rule of the algorithm selected from: upon entry of the individually entered symbol via the symbol entering means, after a predetermined period of time post entry of the individually entered symbol, and upon entry of a next symbol following entry of the individually entered symbol;

wherein the algorithm causes concealment of an entered symbol by replacing the entered symbol with a non-user entered symbol; and wherein the application provides a first switching means, the first switching means permitting a user to switch between the first mode and the second mode.

15. The combination of claim 14, wherein the symbol entry means comprise a keyboard and the keyboard includes a key, wherein depression of the key switches the application on.

\* \* \* \* \*